(12) United States Patent
Ando et al.

(10) Patent No.: US 11,575,252 B2
(45) Date of Patent: Feb. 7, 2023

(54) MEMBER JUNCTION STRUCTURE AND ELECTRIC JUNCTION BOX

(71) Applicant: Yazaki Corporation, Tokyo (JP)

(72) Inventors: Ryota Ando, Shizuoka (JP); Masayuki Nagano, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 144 days.

(21) Appl. No.: 17/209,406

(22) Filed: Mar. 23, 2021

(65) Prior Publication Data
US 2021/0305792 A1 Sep. 30, 2021

(30) Foreign Application Priority Data
Mar. 30, 2020 (JP) .............................. JP2020-060124

(51) Int. Cl.
*H02G 3/08* (2006.01)
*H02G 3/14* (2006.01)
*H02G 3/10* (2006.01)

(52) U.S. Cl.
CPC ............... *H02G 3/081* (2013.01); *H02G 3/10* (2013.01); *H02G 3/14* (2013.01)

(58) Field of Classification Search
CPC .......... H02G 3/08; H02G 3/081; H02G 3/086; H02G 3/14; H02G 3/10; H05K 5/00; H05K 5/02
USPC ......... 174/50, 520, 17 R, 59, 559, 560, 561; 439/76.1, 76.2, 949, 535; 361/600, 601, 361/730, 740, 752
See application file for complete search history.

(56) References Cited

U.S. PATENT DOCUMENTS

| | | | | |
|---|---|---|---|---|
| 4,580,861 A * | 4/1986 | Kaley | ................. | H01R 13/514 439/594 |
| 5,507,077 A * | 4/1996 | Kotajima | ............... | H02G 3/263 24/669 |
| 5,915,978 A * | 6/1999 | Hayakawa | ........... | H01R 9/2425 439/949 |
| 6,196,882 B1 * | 3/2001 | Sato | ..................... | H01R 9/2408 174/59 |

(Continued)

FOREIGN PATENT DOCUMENTS

| CN | 103682721 A | 3/2014 |
|---|---|---|
| JP | 2002-034117 A | 1/2002 |

(Continued)

*Primary Examiner* — Angel R Estrada
(74) *Attorney, Agent, or Firm* — Sughrue Mion, PLLC

(57) ABSTRACT

A member junction structure includes a first member provided with a first press-fitting portion and a second press-fitting portion, and a second member provided with a first press-fitted portion and a second press-fitted portion and configured to be installed on the first member by moving in a first direction which is a predetermined one direction with respect to the first member. In a state where the second member is halfway to be installed on the first member, the first press-fitting portion is inserted into the second press-fitted portion, thereby providing a guide for installing the second member on the first member. In a state where the second member is completely installed on the first member, the first press-fitting portion is press-fitted into the first press-fitted portion, and the second press-fitting portion is press-fitted into the second press-fitted portion.

9 Claims, 11 Drawing Sheets

(56) References Cited

U.S. PATENT DOCUMENTS

| | | | |
|---|---|---|---|
| 6,659,792 B2 * | 12/2003 | Saka | H01R 13/5213 |
| | | | 174/59 |
| 6,753,472 B2 * | 6/2004 | Ito | H01R 9/2408 |
| | | | 174/59 |
| 6,786,740 B2 * | 9/2004 | Ito | H01R 13/514 |
| | | | 439/76.2 |
| 8,163,994 B2 * | 4/2012 | Taniguchi | H02G 3/081 |
| | | | 174/559 |
| 2014/0065897 A1 | 3/2014 | Kida et al. | |
| 2016/0204671 A1 | 7/2016 | Otsuka et al. | |
| 2019/0058371 A1 | 2/2019 | Otsuka et al. | |

FOREIGN PATENT DOCUMENTS

| | | |
|---|---|---|
| JP | 2010-112509 A | 5/2010 |
| JP | 2016-131437 A | 7/2016 |

* cited by examiner

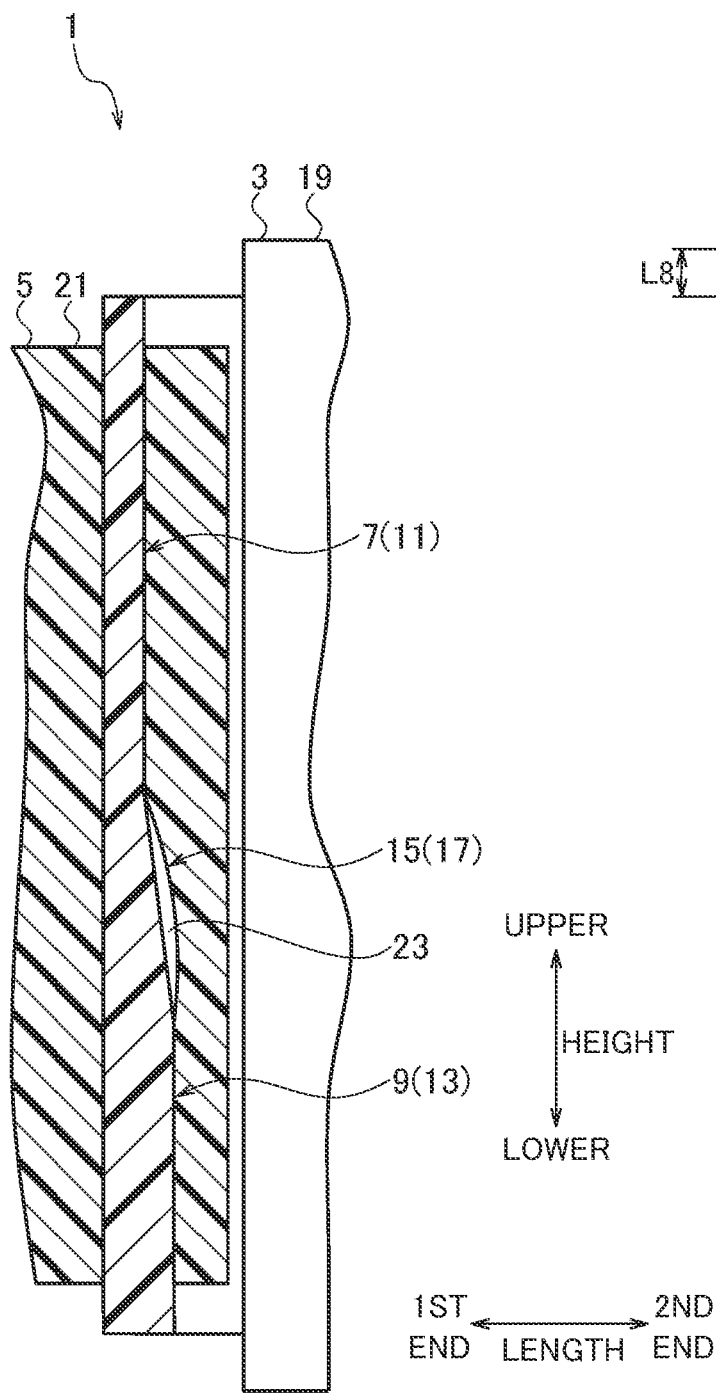
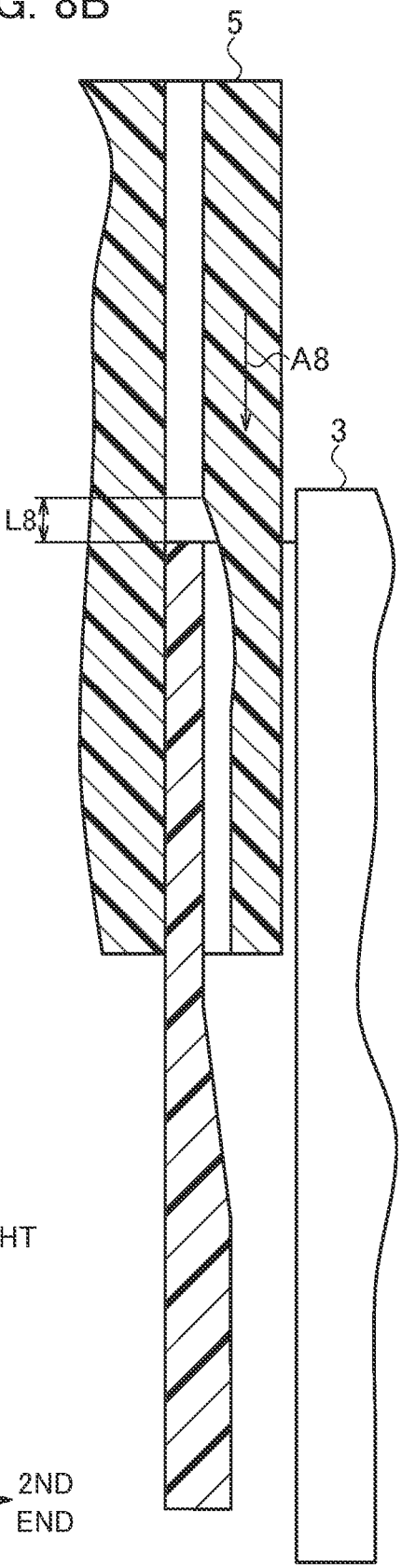

FIG. 11C
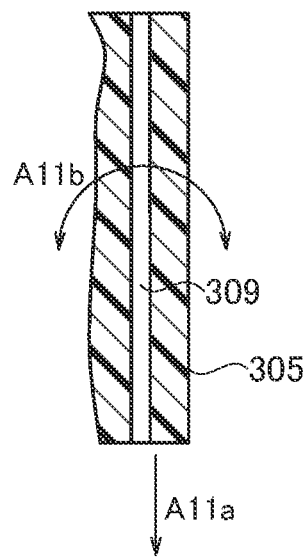
FIG. 11A
FIG. 11B
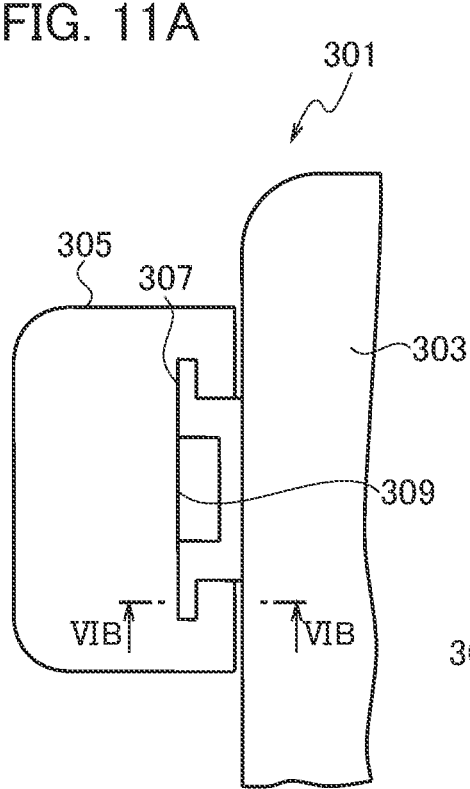
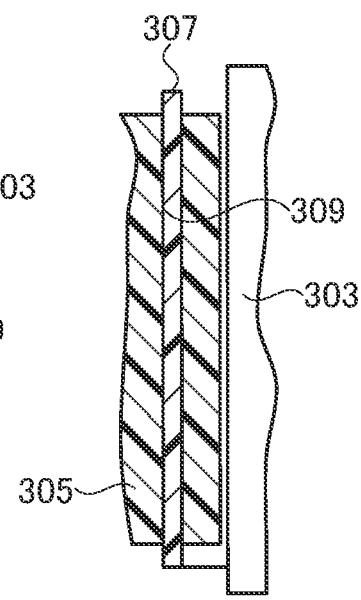
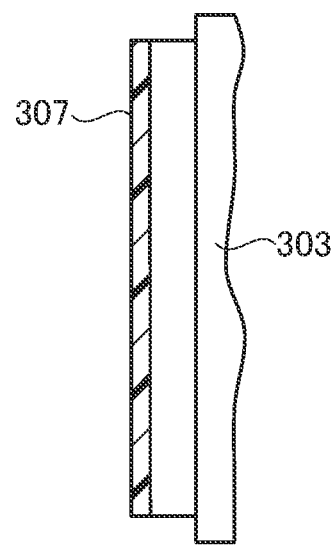
FIG. 11D
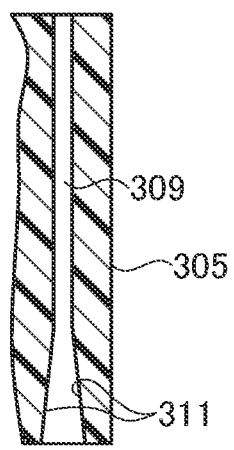

MEMBER JUNCTION STRUCTURE AND ELECTRIC JUNCTION BOX

CROSS-REFERENCE TO RELATED APPLICATIONS

The present application is based on, and claims priority from Japanese Patent Application No. 2020-060124, filed on Mar. 30, 2020, the entire contents of which are incorporated protein by reference.

TECHNICAL FIELD

The disclosure relates to a member junction structure and a electric junction box.

BACKGROUND

Conventionally, when the two resin brackets are joined to each other, an engaging portion of a first resin bracket is engaged with an engaged portion of a second resin bracket. In this engagement, the engagement portion of the first resin bracket and the engaged portion of the second resin bracket are engaged by zero-touch or press-fitting. That is, the two resin brackets are joined to each other by a transition fitting or an interference fitting.

This structure prevents looseness between the two resin brackets caused by vibration or the like of the vehicle. Patent Document 1 (JP 2010-112509 A) is described as a conventional technical document.

SUMMARY

Incidentally, in the conventional junction structure, in order to increase a joining strength of the two resin brackets (first and second members), if the two resin brackets are joined by press-fitting, the following problems may occur.

In order to press-fitting the two resin brackets, a large force is required, and it is difficult to press-fit them by bare hands without using a dedicated press machine or the like. Therefore, in some cases, the two resin brackets are temporarily press-fitted with bare hands, and then a main press-fitting is performed by using a dedicated press machine or the like to end the press-fitting.

However, if the press-fitting amount in the temporary press-fitting between the two resin brackets is insufficient, there is a possibility that the second resin bracket is inclined obliquely with respect to the first resin bracket when the main press-fitting is performed by using a dedicated press machine or the like. If the main press-fitting is attempted while the resin bracket is inclined obliquely, the press-fitting portion and the press-fitted portion of the resin bracket may be damaged.

Therefore, by forming an oblique deep guide surface (long slope in an insertion direction) at at least one of the end of the press-fitting portion of the first resin bracket and the end of the press-fitting portion of the second resin bracket, it is possible to secure a sufficient press-fitting amount in the temporary press-fitting between the two resin brackets.

However, if the deep guide surface is formed, when the second resin bracket is fully press-fitted into the first resin bracket and the junction is completed, the area of the contact surface between the press-fitting portion of the first resin bracket and the press-fitted portion of the second resin bracket becomes small, and the joining strength between two resin brackets becomes weak, and there is a possibility that looseness occurs between two resin brackets.

It is an object of the present application to provide a member junction structure and a electric junction box which can secure a sufficient amount of a temporary press-fitting, facilitate a main press-fitting, and secure the joining strength between two members after the main press-fitting when the first member and the second member are joined to each other by press-fitting.

A member junction structure according an embodiment includes a first member provided with a first press-fitting portion and a second press-fitting portion, and a second member provided with a first press-fitted portion and a second press-fitted portion, and configured to be installed on the first member by moving in a first direction which is a predetermined one direction with respect to the first member. In a state where the second member is halfway to be installed on the first member, the first press-fitting portion is inserted into the second press-fitted portion, thereby providing a guide for installing the second member on the first member. In a state where the second member is completely installed on the first member, the first press-fitting portion is press-fitted into the first press-fitted portion, and the second press-fitting portion is press-fitted into the second press-fitted portion.

The first member and the second member may be fitted in at least one of: a first fitting mode where the second member is completely installed on the first member and when the first press-fitting portion is press-fitted into the first press-fitted portion, the first member and the second member are fitted in an interference-fitting state at a plurality of places in a predetermined direction different from the first direction; and a second fitting mode where the second member is completely installed on the first member and when the second press-fitting portion is press-fitted into the second press-fitted portion, the first member and the second member are fitted in an interference-fitting state at a plurality of places in a predetermined direction different from the first direction.

When a predetermined direction crossing the first direction is defined as a second direction, in the first fitting mode, the first member and the second member may be fitted at the plurality of places in the second direction in an interference-fitting state.

When a predetermined direction crossing the first direction is defined as a second direction, in the second fitting mode, the first member and the second member may be fitted at the plurality of places in the second direction in an interference-fitting state.

The guide in the state where the second member is halfway to be installed on the first member may be a guide for positioning the second member with respect to the first member in a direction orthogonal to the moving direction of the second member.

The first press-fitting portion and the second press-fitting portion of the first member may be separated from each other in the first direction; between the first press-fitting portion and the second press-fitting portion of the first member, a press-fitting portion intermediate portion may be provided; the first press-fitted portion and the second press-fitted portion of the second member may be separated from each other in the first direction; between the first press-fitted portion and the second press-fitted portion of the second member, a press-fitted portion intermediate portion may be provided; and in a state where the second member is completely installed on the first member, the press-fitted portion intermediate portion may be slightly separated from the press-fitted portion intermediate portion.

An electric junction box according to embodiment includes a resin bracket press-fitting structure including a first resin bracket and a second resin bracket. The first resin bracket includes a first resin bracket body portion, a first press-fitting portion projecting from the first resin bracket body portion, a press-fitting portion intermediate portion adjacent to the first press-fitting portion in a first direction, which is a predetermined one direction, and projecting from the first resin bracket body portion, and a second press-fitting portion adjacent to the press-fitting portion intermediate portion in the first direction and projecting from the first resin bracket body portion. The second resin bracket includes a second resin bracket body portion, a first press-fitted portion formed of a recess provided in the second resin bracket body portion, a press-fitted portion intermediate portion adjacent to the first press-fitted portion in the first direction, and formed of a recess provided in the second resin bracket body portion, and a second press-fitted portion adjacent to the of the press-fitted portion intermediate portion in the first direction and formed of a recess provided in the second resin bracket body portion. By moving the second resin bracket relative to the first resin bracket in the first direction, the first press-fitting portion is press-fitted into the first press-fitted portion, and the second press-fitting portion is press-fitted into the second press-fitted portion.

According to the embodiment, it is possible to provide the member junction structure and the electric junction box which can secure a sufficient amount of the temporary press-fitting, facilitate the main press-fitting, and secure joining strength between two members after the main press-fitting.

BRIEF DESCRIPTION OF THE DRAWINGS

FIG. 8A is a view illustrating a cross section taken along a line VIIIA-VIIIA in FIG. 2.
FIG. 8B is a diagram corresponding to FIG. 8A and illustrates a state in a middle of installation.
FIGS. 11A to 11D are views illustrating member junction structures according to comparative examples.

DETAILED DESCRIPTION

Figure 1:
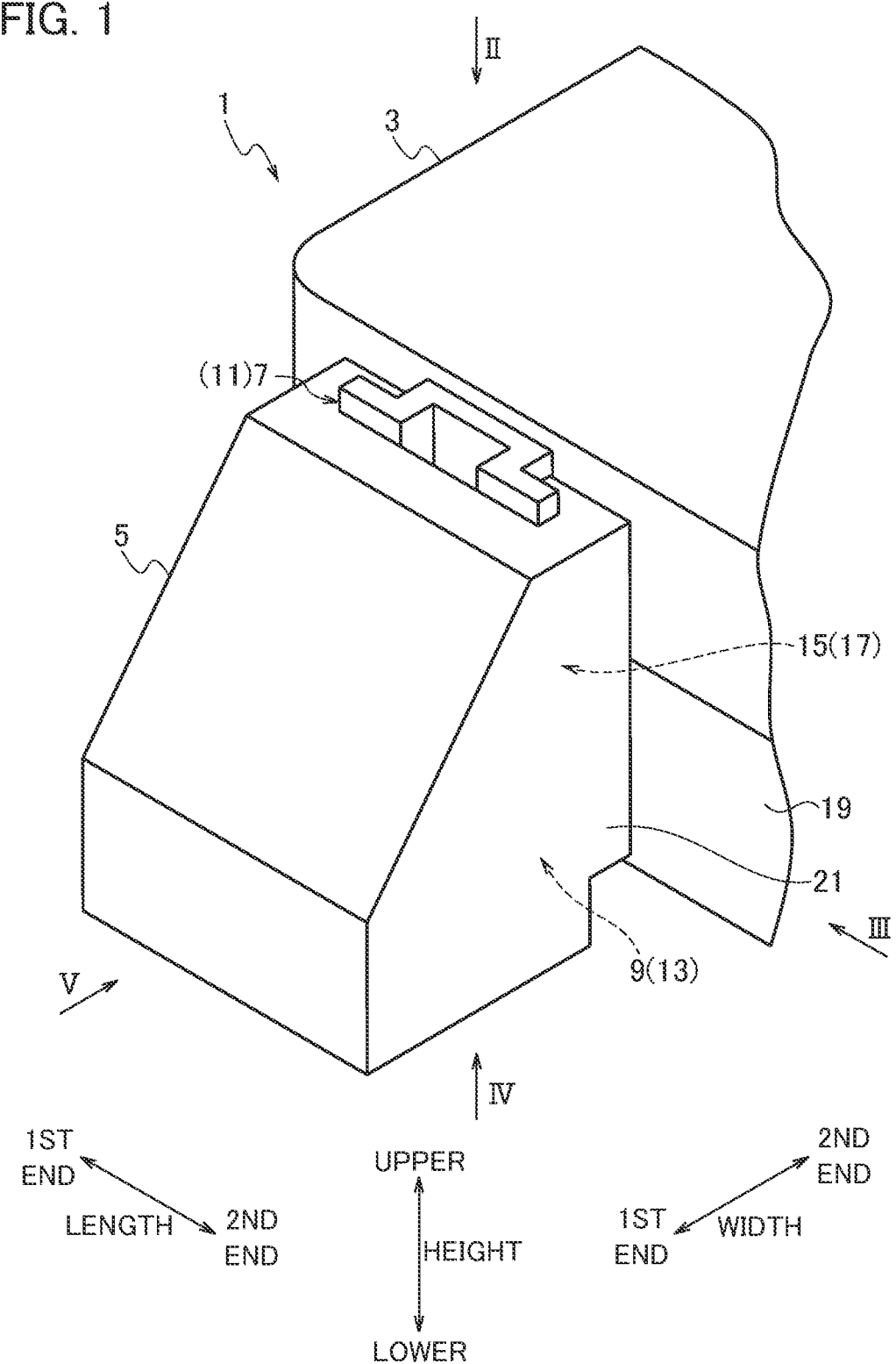
FIG. 1 is a perspective view illustrating a member junction structure according to an embodiment.

As illustrated in FIGS. 1 to 7, a member junction structure 1 according to an embodiment is used when a first member 3 and a second member 5 are joined to each other. The first member 3 may be, for example, a first resin bracket, and the second member 5 may be, for example, a second resin bracket. Also, the "member junction structure" may be called as a "member press-fitting structure" or a "resin bracket press-fitting structure" or a "resin bracket junction structure".

Here, for convenience of explanation, a predetermined direction is defined as a length direction, another predetermined direction orthogonal to the length direction is defined as a width direction, and a direction orthogonal to the length direction and the width direction is defined as a height direction. Note that the height direction is not necessarily in a vertical direction.

The first member 3 is provided with a first press-fitting portion 7 and a second press-fitting portion 9. The second member 5 is provided with a first press-fitted portion 11 and a second press-fitted portion 13.

In the member junction structure 1, the second member 5 is moved in a first direction (height direction) which is a predetermined one direction with respect to the first member 3 (see an arrow A8 in FIG. 8B). By this movement, the first press-fitted portion 11 is press-fitted with the first press-fitting portion 7, and the second press-fitted portion 13 is press-fitted with the second press-fitting portion 9. Thus the second member 5 is installed integrally with the first member 3.

In an installation halfway state where the second member 5 is in the middle of being installed on the first member 3 (see FIG. 8B), the first press-fitting portion 7 is inserted into the second press-fitted portion 13 to provide a guide for installing the second member 5 on the first member 3. With this guide, the second member 5 can move only in the height direction while maintaining a fixed attitude with respect to the first member 3.

In an installation end state (see FIGS. 1 to 7 and 8A) where the second member 5 has been installed on the first member 3, the first press-fitted portion 11 is press-fitted with the first press-fitting portion 7, and the second press-fitted portion 13 is press-fitted with the second press-fitting portion 9.

The second member 5 is installed on the first member 3 by linearly moving the second member 5 from an upper side to a lower side in the height direction with respect to the first member 3 while maintaining the positions of the first member 3 and the second member 5 from an installation preparation state. In the installation preparation state, the first member 3 in a predetermined posture and the second member 5 in a predetermined posture are separated by a predetermined distance in a predetermined positional relationship.

More specifically, in the installation preparation state, the first press-fitted portion 11 and the second press-fitted portion 13 of the second member 5 are arranged in this order from the upper side to the lower side in the height direction. The first press-fitting portion 7 and the second press-fitting portion 9 of the first member 3 are arranged in this order from the upper side to the lower side in the height direction.

In the installation preparation state, the second member 5 is positioned on the upper side of the first member 3 away from the first member 3 in the height direction. In the installation preparation state, the positions of the first press-fitting portion 7 of the first member 3 and the second press-fitting portion 9 of the first member 3, and the positions of the first press-fitted portion 11 of the second member 5 and the second press-fitted portion 13 of the second member 5 substantially coincide with each other in the length and width directions.

When the second member 5 is moved downward by a predetermined distance with respect to the first member 3 in the installation preparation state, the installation halfway state is established.

In the installation halfway state, the second press-fitted portion 13 of the second member 5 is fitted with the first press-fitting portion 7 of the first member 3, and the first press-fitting portion 7 is engaged with the second press-fitted portion 13. However, in the installation halfway state, the first press-fitted portion 11 of the second member 5 is not engaged with the first press-fitting portion 7 of the first member 3. More specifically, in the installation halfway state, the first press-fitting portion 7 of the first member 3 is not fitted to the second press-fitted portion 13 of the second member 5 in an interference-fitting state, but the first press-fitting portion 7 of the first member 3 is fitted to the second press-fitted portion 13 of the second member 5 in a clearance-fitting state.

In the installation halfway state, the second member 5 is engaged with the first member 3 with a slight looseness. Therefore, the second member 5 can be moved almost linearly only downwardly with respect to the first member 3 in the installation halfway state.

When the second member 5 is further moved downward by a predetermined distance with respect to the first member 3 from the installation halfway state, the installation end state is completed.

In the installation end state, the first press-fitted portion 11 of the second member 5 is press-fitted with the first press-fitting portion 7 of the first member 3. That is, in the installation end state, the first press-fitted portion 11 is fitted with the first press-fitting portion 7 in an interference-fitting state.

In the installation end state, the second press-fitted portion 13 of the second member 5 is press-fitted with the second press-fitting portion 9 of the first member 3. That is, in the installation end state, the second press-fitting portion 9 is fitted to the second press-fitted portion 13 in an interference-fitting state.

In the member junction structure 1, the first member 3 and the second member 5 are fitted to each other in at least one of the following first fitting mode and second fitting mode.

In the first fitting mode, when the second member 5 is completely installed on the first member 3 and the first press-fitted portion 11 is press-fitted into the first press-fitting portion 7, the first member 3 and the second member 5 are fitted in an interference-fitting state at a plurality of places (e. g., two places) in a predetermined direction. The predetermined direction in the first fitting mode is a predetermined direction different from the first direction (height direction).

In the second fitting mode, when the second member 5 is completely installed on the first member 3 and the second press-fitting portion 9 is press-fitted into the second press-fitted portion 13, the first member 3 and the second member 5 are fitted in an interference-fitting state at a plurality of places (e. g., two places) in a predetermined direction. The predetermined direction in the second fitting mode is a predetermined direction different from the first direction (height direction), and is, for example, the same direction as the predetermined direction in the first fitting mode.

Here, a predetermined direction crossing (e.g., orthogonal) to the first direction (height direction) is defined as a second direction (the length direction), and a direction crossing (e.g., orthogonal) to the first direction and the second direction is defined as a third direction (the width direction).

In the first fitting mode, the first member 3 and the second member 5 are fitted at a plurality of places (e. g., two places) in the length direction in an interference-fitting state. More specifically, in the installation end state, the second member 5 pinches the first member 3 in the length direction, but there are two places where the first member 3 is pinched. The two pinched places are separated from each other in the width direction.

In the first fitting mode, the first member 3 and the second member 5 are fitted to each other at a plurality of places (e. g., two places) in the width direction. More specifically, in the installation end state, the second member 5 pinches the first member 3 in the width direction, but there are two places where the first member 3 is pinched. The two pinched places are separated from each other in the length direction.

In the second fitting mode, similarly to the first fitting mode, the first member 3 and the second member 5 are fitted at a plurality of places (e. g., two places) in the length direction in an interference-fitting state. More specifically, in the installation end state, the second member 5 pinches the first member 3 in the length direction, but there are two places where the first member 3 is pinched. The two pinched places are separated from each other in the width direction.

In the second fitting mode, similarly to the first fitting mode, the first member 3 and the second member 5 are fitted at a plurality of places (e. g., two places) in the width direction in an interference-fitting state. More specifically, in the installation end state, the second member 5 pinches the first member 3 in the width direction, but there are two places where the first member 3 is pinched. The two pinched places are separated from each other in the width direction.

With the guide of the second member 5 in the installation halfway state, the second member 5 is positioned with respect to the first member 3 in a direction orthogonal to the moving direction of the second member 5. That is, with the guide of the second member 5 in the installation halfway state, the second member 5 is positioned with respect to the first member 3 in both the length and width directions.

Further, with the guide of the second member 5 in the installation halfway state, the posture of the second member 5 with respect to the first member 3 around the axis extending in the height direction (turning angle) can be maintained substantially constant. Further, with the guide of the second member 5 in the installation halfway state, the posture of the second member 5 with respect to the first member 3 around the axis extending in the length direction (turning angle) can be maintained substantially constant. Further, with the guide of the second member 5 in the installation halfway state, the posture of the second member 5 with respect to the first member 3 around the axis extending in the width direction (turning angle) can be maintained substantially constant.

The first member 3 is provided with a press-fitting portion intermediate portion 15, in addition to the first press-fitting portion 7 and the second press-fitting portion 9. The first press-fitting portion 7 and the second press-fitting portion 9 are separated from each other in the height direction. The press-fitting portion intermediate portion 15 is provided between the first press-fitting portion 7 and the second press-fitting portion 9. The press-fitting portion intermediate portion 15 is connected to both the first press-fitting portion 7 and the second press-fitting portion 9.

The second member 5 is provided with a press-fitted portion intermediate portion 17, in addition to the first press-fitted portion 11 and the second press-fitted portion 13. The first press-fitted portion 11 and the second press-fitted portion 13 are separated from each other in the height direction. The press-fitted portion intermediate portion 17 is provided between the first press-fitted portion 11 and the second press-fitted portion 13. The press-fitted portion intermediate portion 17 is connected to both the first press-fitted portion 11 and the second press-fitted portion 13.

In the installation end state where the second member 5 is completely installed in the first member 3, the press-fitted portion intermediate portion 17 is slightly separated from the press-fitting portion intermediate portion 15 in the length and width directions.

Here, the first member 3 is assumed to the first resin bracket and the second member 5 is assumed to the second resin bracket as an example, and the member junction structure 1 will be further described.

The first resin bracket 3 includes a first resin bracket body portion 19, the first press-fitting portion 7, the press-fitting portion intermediate portion 15, and the second press-fitting portion 9. The first resin bracket 3 is integrally molded.

The first press-fitting portion 7, the second press-fitting portion 9, and the press-fitting portion intermediate portion 15 protrude from the first resin bracket body portion 19 from a first end which is one end in the width direction (third direction).

The press-fitting portion intermediate portion 15 is disposed below the first press-fitting portion 7 in the height direction, and is adjacent to the first press-fitting portion 7. The second press-fitting portion 9 is disposed below the press-fitting portion intermediate portion 15 in the height direction, and is adjacent to the press-fitting portion intermediate portion 15.

The second resin bracket 5 includes a second resin bracket body portion 21, the first press-fitted portion 11, the press-fitted portion intermediate portion 17, and the second press-fitted portion 13. The second resin bracket 5 is integrally molded.

The first press-fitted portion 11, the press-fitted portion intermediate portion 17, and the second press-fitted portion 13 are formed of recess portions provided in the second resin bracket body portion 21. The recess portions are recessed from the second end to the first end side in the width direction.

The press-fitted portion intermediate portion 17 is disposed below the first press-fitted portion 11 in the height direction and is adjacent to the first press-fitted portion 11. The second press-fitted portion 13 is disposed below the press-fitted portion intermediate portion 17 in the height direction, and is adjacent to the press-fitted portion intermediate portion 17.

By moving the second resin bracket 5 with respect to the first resin bracket 3 in the height direction, the first press-fitting portion 7 is press-fitted into the first press-fitted portion 11, and the second press-fitting portion 9 is press-fitted into the second press-fitted portion 13.

In the installation halfway state where the second resin bracket 5 is in the middle of being installed on the first resin bracket 3, the second press-fitted portion 13 of the second resin bracket 5 is fitted with the first press-fitting portion 7 of the first resin bracket 3 in a clearance fitting state. Thus, in the installation halfway state, the second resin bracket 5 can be moved almost linearly only to the lower side with respect to the first resin bracket 3.

The engagement between the first press-fitting portion 7 and the second press-fitted portion 13 in the installation halfway state may be in a zero-touch state (fitting state of the transition fitting). In the fitting state of the transition fitting, a very small interference (indentation allowance) may be present.

In an installation end state where the second resin bracket 5 is completely installed on the first resin bracket 3, the first press-fitting portion 7 is press-fitted into the first press-fitted portion 11, the second press-fitting portion 9 is press-fitted into the second press-fitted portion 13, and the first resin bracket 3 and the second resin bracket 5 are integrated.

In the installation end state, the press-fitted portion intermediate portion 17 is slightly separated from the press-fitting portion intermediate portion 15. In other words, in the installation end state, the surface of the press-fitted portion intermediate portion 17 and the surface of the press-fitting portion intermediate portion 15 are not in contact with each other, and a slight gap 23 (see FIGS. 3, 6, 7, and the like) is formed between the surface of the press-fitted portion intermediate portion 17 and the surface of the press-fitting portion intermediate portion 15.

The installation of the second resin bracket 5 on the first resin bracket 3 will be further described. During a period from the installation preparation state to the installation end state through the installation halfway state, the first press-fitting portion 7, the press-fitting portion intermediate portion 15, and the second press-fitting portion 9 of the first resin bracket 3 are inserted into the second press-fitted portion 13 of the second resin bracket 5 in this order.

During the period from the installation preparation state to the installation end state through the installation halfway state, the first press-fitting portion 7 and the press-fitting portion intermediate portion 15 of the first resin bracket 3 are inserted into the press-fitted portion intermediate portion 17 of the second resin bracket 5 in this order.

During the period from the installation preparation state to the installation end state through the installation halfway state, the first press-fitting portion 7 of the first resin bracket 3 is inserted into the first press-fitted portion 11 of the second resin bracket 5.

Here, the first press-fitting portion 7, the press-fitting portion intermediate portion 15, and the second press-fitting portion 9 of the first resin bracket 3 will be described in more detail. The cross-sectional shape of the first press-fitting portion 7 in a plane perpendicular to the height direction is a certain shape. The cross-sectional shape of the second press-fitting portion 9 in a plane perpendicular to the height direction is also in a certain shape. However, when viewed in the height direction, the first press-fitting portion 7 is accommodated inside the second press-fitting portion 9.

In some cases, a part of the outer periphery of the first press-fitting portion 7 overlaps with a part of the outer periphery of the second press-fitting portion 9 in a state where the first press-fitting portion 7 is accommodated inside the second press-fitting portion 9 in the height direction.

The cross-sectional shape of the press-fitting portion intermediate portion 15 formed by a plane perpendicular to the height direction is changed to gradually increase from the first press-fitting portion 7 toward the second press-fitting portion 9 while maintaining a substantially similar shape. However, when the cross-sectional shape of the press-fitting portion intermediate portion 15 in the plane perpendicular to the height direction is viewed in the first direction, the cross-sectional shape of any portion is within the region between the outer periphery of the second press-fitting portion 9 and the outer periphery of the first press-fitting portion 7.

The state where the cross section of the press-fitting portion intermediate portion 15 in the height direction is within an area surrounded by the outer periphery of the second press-fitting portion 9 and the outer periphery of the first press-fitting portion 7 will be described. In this state, a part of the outer periphery of the cross section of the press-fitting portion intermediate portion 15 may overlap at least one of a part of the outer periphery of the second press-fitting portion 9 and a part of the outer periphery of the first press-fitting portion 7.

When viewed in the height direction, a cross section of the press-fitting portion intermediate portion 15 at the boundary between the first press-fitting portion 7 and the press-fitting portion intermediate portion 15 overlaps with the cross section of the first press-fitting portion 7. When viewed in the height direction, a cross section of the press-fitting portion intermediate portion 15 at the boundary between the second press-fitting portion 9 and the press-fitting portion intermediate portion 15 overlaps with the cross section of the second press-fitting portion 9.

The first press-fitted portion 11, the press-fitted portion intermediate portion 17, and the second press-fitted portion 13 of the second resin bracket 5 will be described. The cross-sectional shape of the first press-fitted portion 11 in a plane perpendicular to the height direction is slightly smaller than that of the first press-fitting portion 7, and has a certain shape similar to that of the first press-fitting portion 7. Since the cross-sectional shape of the first press-fitted portion 11 is slightly smaller than that of the first press-fitting portion 7, a press-fitting margin is secured.

The cross-sectional shape of the second press-fitted portion 13 in a plane perpendicular to the height direction is slightly smaller than that of the second press-fitting portion 9, and has a certain shape similar to that of the second press-fitting portion 9. Since the shape of the second press-fitted portion 13 is slightly smaller than that of the second press-fitting portion 9, a press-fitting margin is secured. When viewed in the height direction, the second press-fitted portion 13 is accommodated inside the first press-fitted portion 11.

Note that in a state where the second press-fitted portion 13 is accommodated inside the first press-fitted portion 11 when viewed in the height direction, a part of the first press-fitted portion 11 may overlap with a part of the outer periphery of the second press-fitted portion 13.

The cross-sectional shape of the press-fitted portion intermediate portion 17 in a plane perpendicular to the height direction is changed so as to gradually increase from the first press-fitted portion 11 toward the second press-fitted portion 13 while maintaining a substantially similar shape. However, when the cross-sectional shape of the press-fitted portion intermediate portion 17 formed by a plane orthogonal to the height direction is viewed in the height direction, the cross-sectional shape of any portion is contained in an area surrounded by the outer periphery of the second press-fitted portion 13 and the outer periphery of the first press-fitted portion 11.

A state will be described in which the cross section of the press-fitted portion intermediate portion 17 is contained within an area surrounded by the outer periphery of the second press-fitted portion 13 and the outer periphery of the first press-fitted portion 11. In this state, in some cases, a part of the outer periphery of the cross section of the press-fitted portion intermediate portion 17 overlaps at least one of a part of the outer periphery of the second press-fitted portion 13 and a part of the outer periphery of the first press-fitted portion 11.

When viewed in the height direction, the cross section of the press-fitted portion intermediate portion 17 at the boundary between the first press-fitted portion 11 and the press-fitted portion intermediate portion 17 overlaps with the cross section of the first press-fitted portion 11. When viewed in the height direction, the cross sections of the press-fitted portion intermediate portion 17 at the boundary between the second press-fitted portion 13 and the press-fitted portion intermediate portion 17 overlaps with the cross section of the second press-fitted portion 13.

When viewed in the height direction, the second press-fitted portion 13 is slightly larger than the first press-fitting portion 7, and has a certain shape similar to the first press-fitting portion 7. The second press-fitted portion 13 has a shape similar to that of the first press-fitting portion 7 and is slightly larger than that of the first press-fitting portion 7, so that a guide is provided in the installation halfway state.

Figure 2:
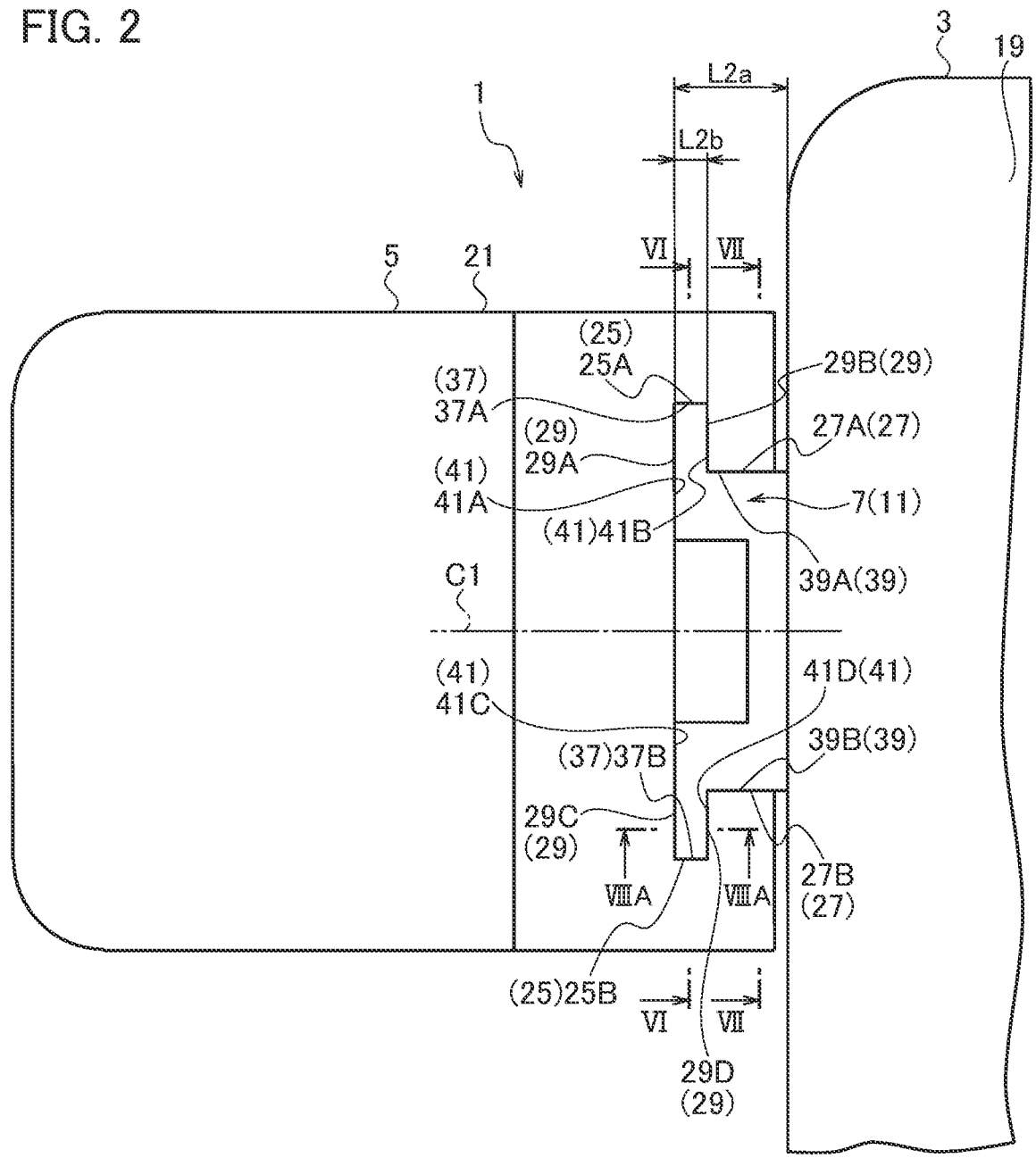
FIG. 2 is a view in an arrow II of FIG. 1.
Figure 3:
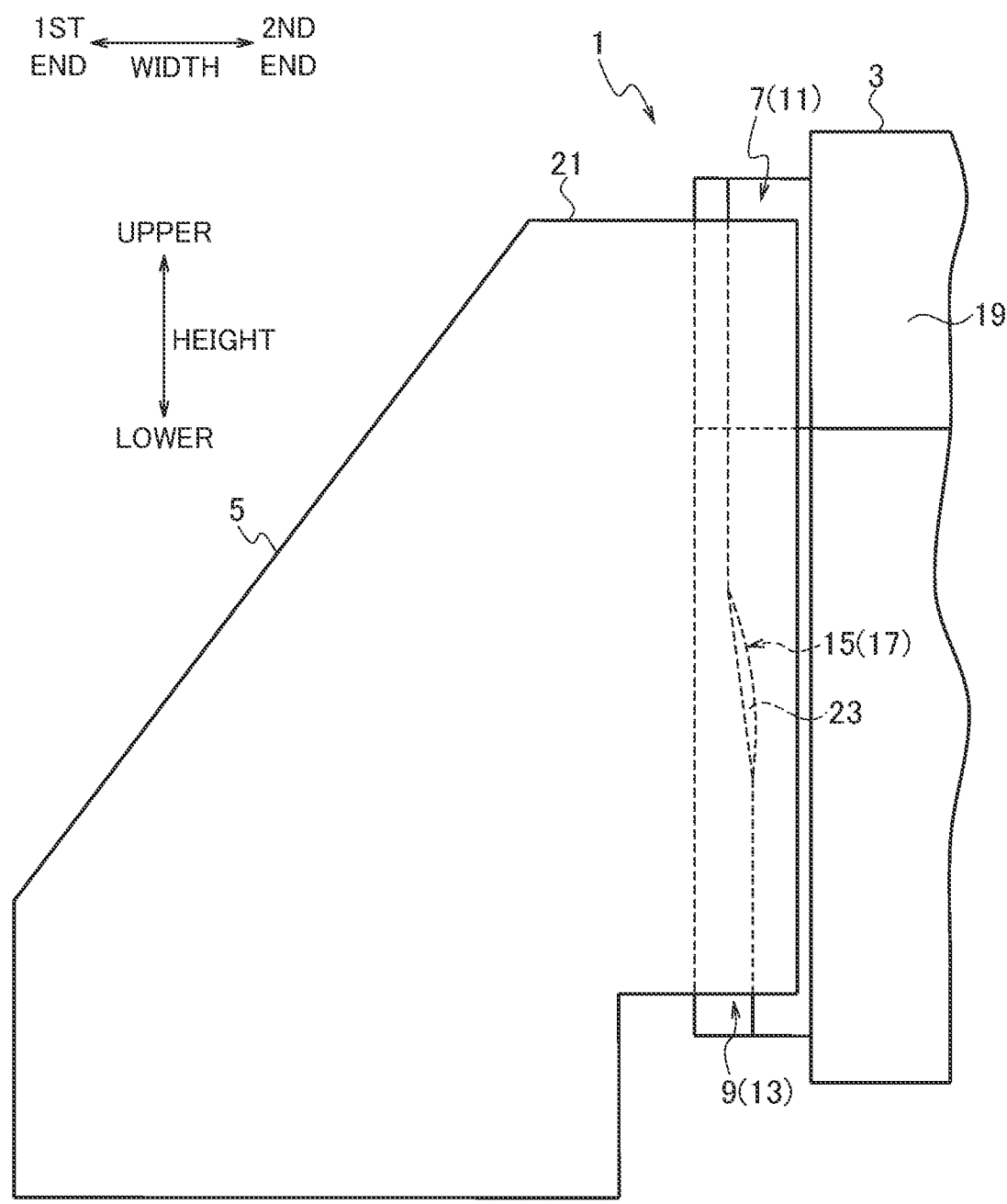
FIG. 3 is a view in an arrow III of FIG. 1.
Figure 4:
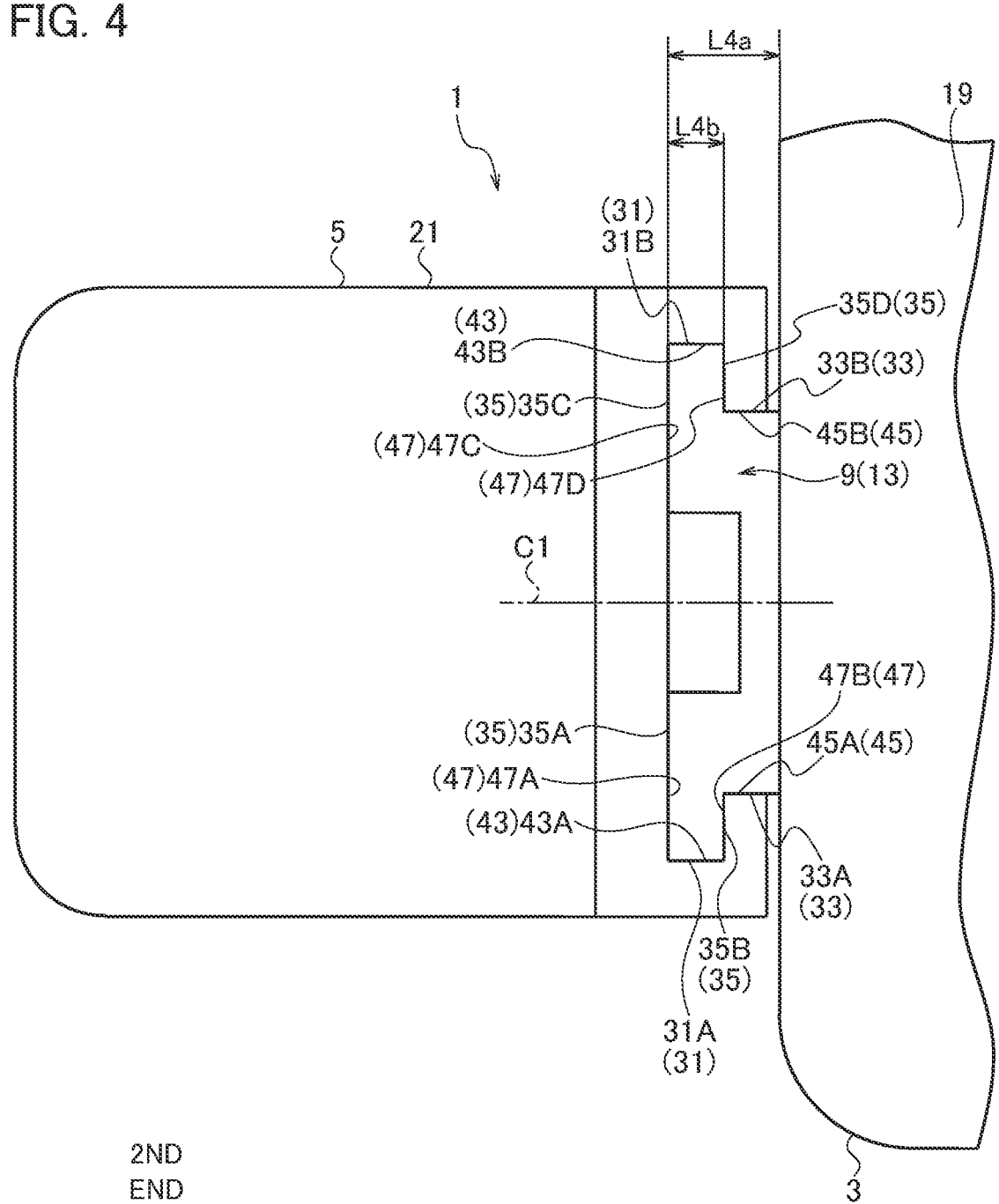
FIG. 4 is a view in an arrow IV of FIG. 1.
Figure 5:
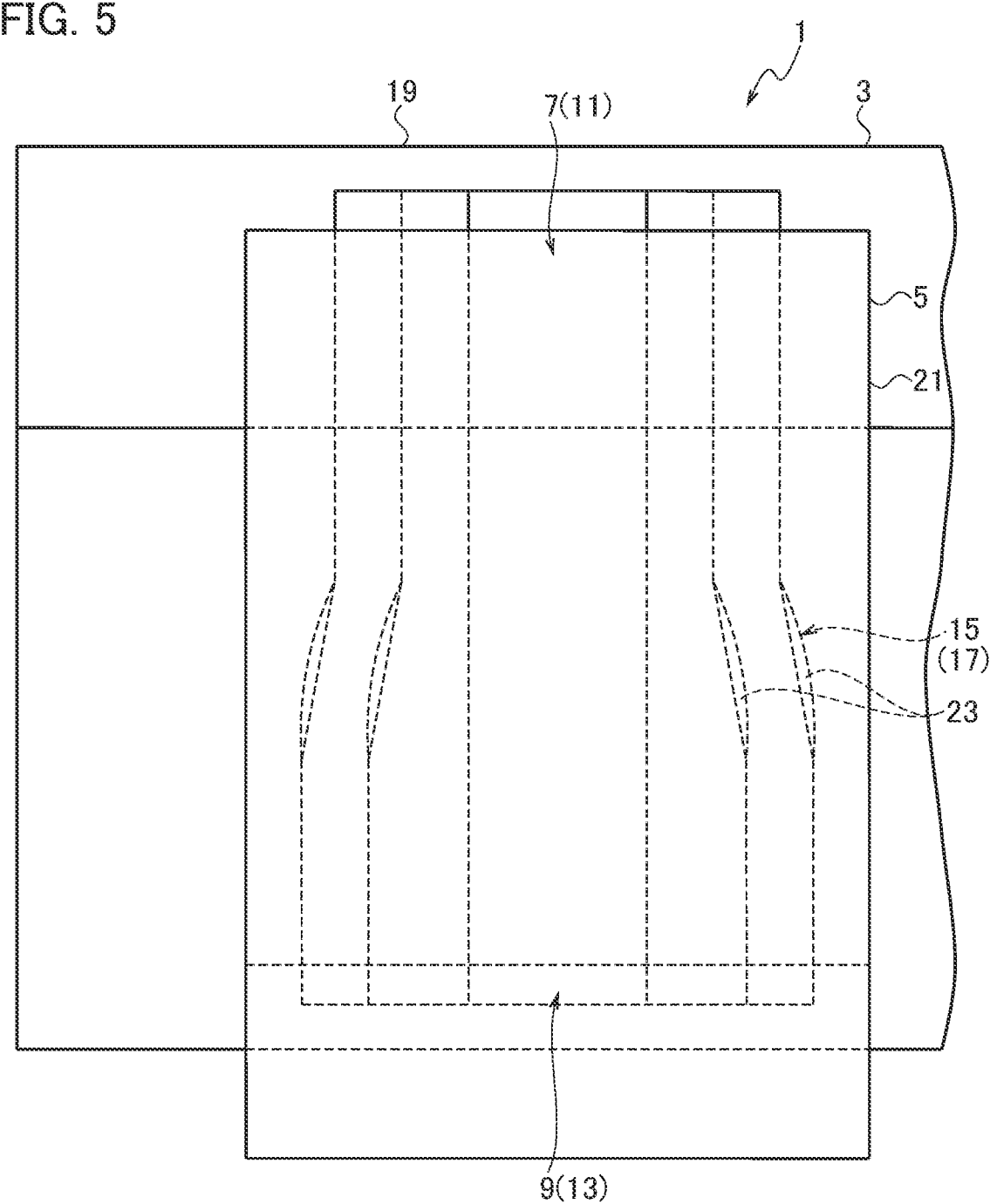
FIG. 5 is a view taken along line V in FIG. 1.
Figure 6:
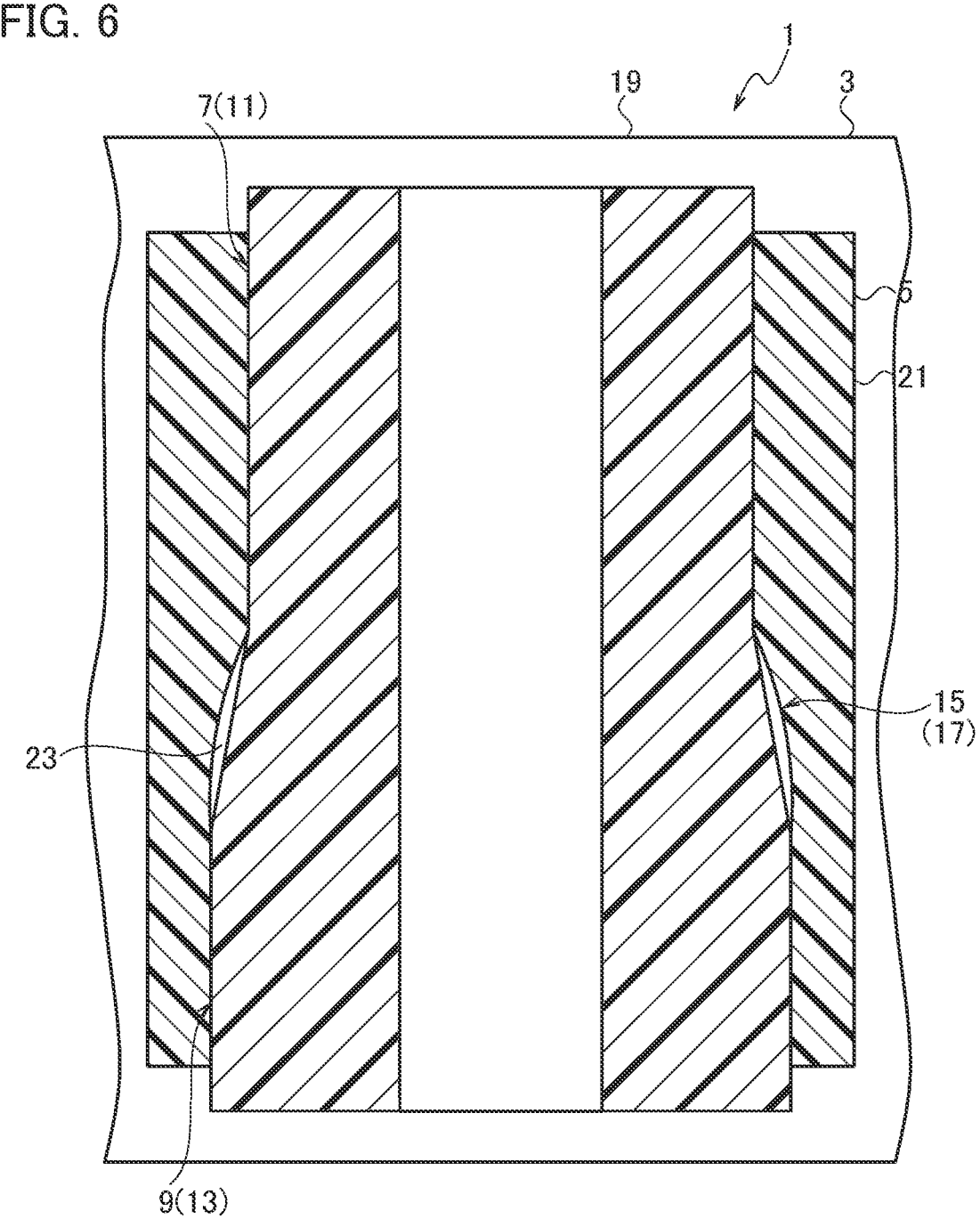
FIG. 6 is a view illustrating a cross section taken along a line VI-VI in FIG. 2.
Figure 7:
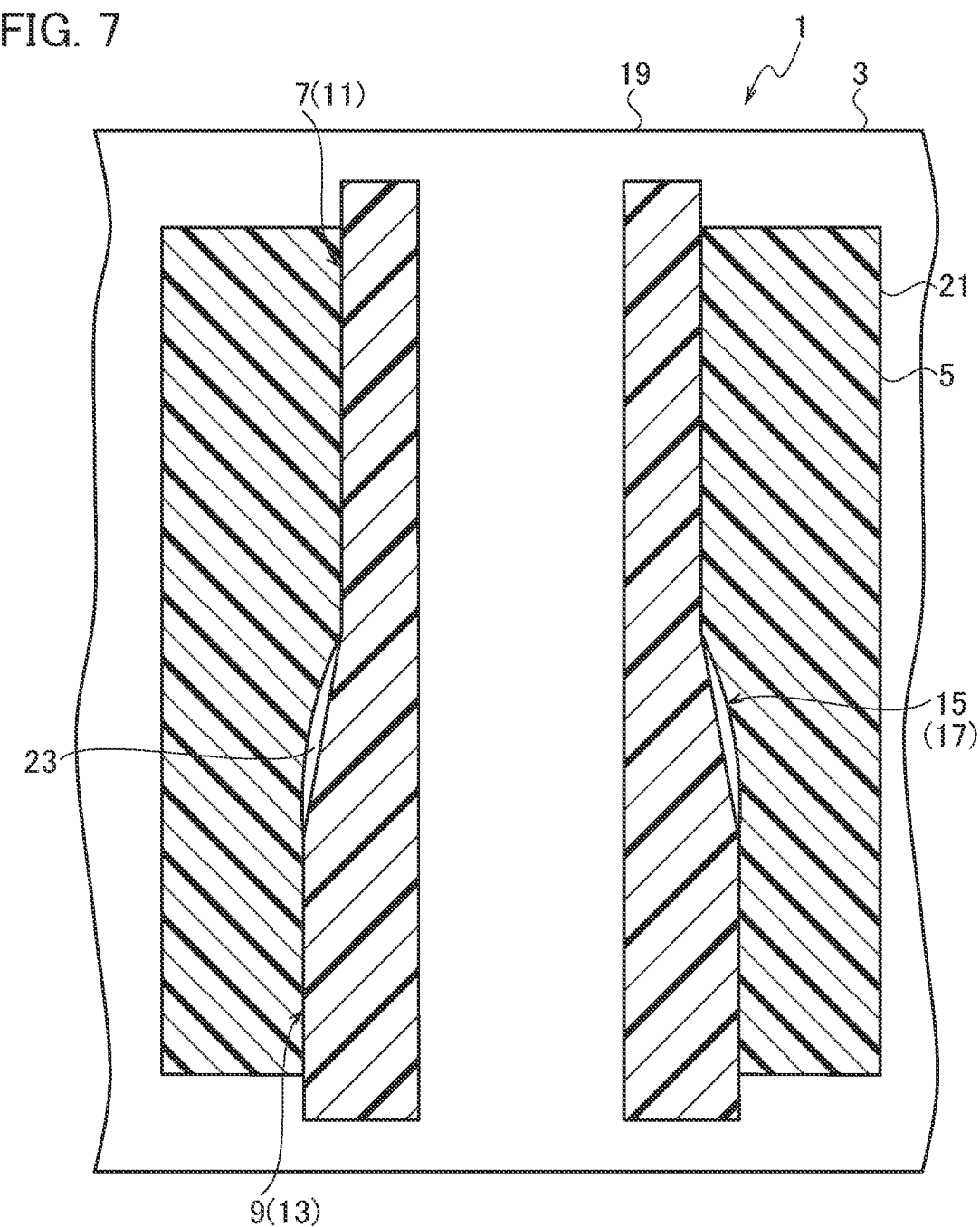
FIG. 7 is a view illustrating a cross section taken along a line VII-VII in FIG. 2.

As illustrated in FIGS. 2 and 4, when viewed in the height direction, each of the first press-fitting portion 7, the second press-fitting portion 9, the first press-fitted portion 11, and the second press-fitted portion 13 is formed in a "T" shape. That is, the first press-fitting portion 7 and the second press-fitting portion 9 form a T-shaped guide rail. The first press-fitted portion 11 and the second press-fitted portion 13 form a T-shaped guide groove.

The first press-fitting portion 7, the second press-fitting portion 9, the first press-fitted portion 11, and the second press-fitted portion 13 are symmetrical with respect to a center plane C1. The center plane C1 is a plane perpendicular to the length direction and includes the centers of the first press-fitting portion 7, the second press-fitting portion 9, the first press-fitted portion 11, and the second press-fitted portion 13.

As illustrated in FIG. 2, the first press-fitting portion 7 includes a pair of first press-fitting portion first planes (two planes) 25 (25A, 25B) separated from each other in the length direction. The first press-fitting portion 7 includes a pair of first press-fitting portion second planes (two planes) 27 (27A, 27B) separated from each other in the length direction. The pair of first press-fitting portion first planes 25 and the pair of first press-fitting portion second planes 27 are positioned different from each other in the width direction.

The first press-fitting portion first planes 25 and the first press-fitting portion second planes 27 are orthogonal to the length direction. The distance between the pair of first press-fitting portion first planes 25A, 25B (distance in the length direction) is larger than the distance between the pair of first press-fitting portion second planes 27A, 27B (distance in the length direction).

The first press-fitting portion 7 includes two pairs of first press-fitting portion third planes 29 (29A, 29B, 29C, 29D).

A first pair of first press-fitting portion third planes 29A, 29B and a second pair of first press-fitting portion third planes 29C, 29D are separated from each other in the length direction.

The first pair of first press-fitting portion third planes 29A, 29B are positioned on the first end side which is one end side in the length direction. The second pair of first press-fitting portion third planes 29C, 29D are positioned on the second end side which is the other end side in the length direction.

The first pair of first press-fitting portion third planes (two planes) 29A, 29B are separated from each other in the width direction. The second pair of first press-fitting portion third planes (two planes) 29C, 29D are separated from each other in the width direction.

The first press-fitting portion third planes 29 are provided with four, and all of the four first press-fitting portion third planes 29 are orthogonal to the second direction (length direction).

Among the four planes 29A, 29B, 29C, 29D constituting the first press-fitting portion third planes, two planes 29A, 29C exist on the same plane (first plane). In addition, among the four planes 29A, 29B, 29C, 29D constituting the first press-fitting portion third planes, the remaining two planes 29B, 29D are also on the other same plane (second plane). However, the first plane and the second plane are separated by a predetermined distance in the width direction.

As illustrated in FIG. 4, the second press-fitting portion 9 includes a pair of second press-fitting portion first planes (two planes) 31 (31A, 31B) separated from each other in the length direction. The second press-fitting portion 9 includes a pair of second press-fitting portion second planes (two planes) 33 (33A, 33B) separated from each other in the length direction.

The second press-fitting portion first planes 31 and the second press-fitting portion second planes 33 are orthogonal to the length direction. The distance between the pair of second press-fitting portion first planes 31A, 31B (distance in the length direction) is larger than the distance between the pair of second press-fitting portion second planes 33A, 33B (distance in the length direction).

The second press-fitting portion 9 includes two pairs of second press-fitting portion third planes 35 (35A, 35B, 35C, 35D).

Of the two pairs of second press-fitting portion third planes 35, a first pair of second press-fitting portion third planes 35A, 35B and a second pair of second press-fitting portion third planes 35C, 35D are separated from each other in the length direction.

The first pair of second press-fitting portion third planes 35A, 35B are positioned on the first end side which is one end side in the length direction, and the second pair of second press-fitting portion third planes 35C, 35D are positioned on the second end side which is the other end side in the length direction.

The first pair of second press-fitting portion third planes (two planes) 35A, 35B are separated from each other in the width direction. The second pair of second press-fitting portion third planes (two planes) 35C, 35D are also separated from each other in the width direction.

The second press-fitting portion third planes 35 are provided with four, and all of the four second press-fitting portion third planes 35 are orthogonal to the length direction.

Among the four planes 35A, 35B, 35C, 35D constituting the second press-fitting portion third planes, two planes 35A, 35C exist on the same plane (first plane). In addition, among the four planes 35A, 35B, 35C, 35D constituting the second press-fitting portion third plane, the remaining two planes 35B, 35D also exist on the other same plane (second plane). The first plane and the second plane are separated by a predetermined distance in the width direction.

As illustrated in FIG. 2, the first press-fitted portion 11 includes a pair of first press-fitted portion first planes (two planes) 37 (37A, 37B) separated from each other in the length direction. The first press-fitted portion 11 includes a pair of first press-fitted portion second planes (two planes) 39 (39A, 39B) separated from each other in the length direction.

The first press-fitted portion first planes 37 and the first press-fitted portion second planes 39 are orthogonal to the length direction. The distance between the pair of first press-fitted portion first planes 37A, 37B (distance in the length direction) is larger than the distance between the pair of first press-fitted portion second planes 39A, 39B (distance in the length direction).

The first press-fitted portion 11 includes two pairs of first press-fitted portion third planes 41 (41A, 41B, 41C, 41D).

Of the two pairs of the first press-fitted portion third planes 41, a first pair of first press-fitted portion third planes 41A, 41B and a second pair of first press-fitted portion third planes 41C, 41D are separated from each other in the length direction.

The first pair of first press-fitted portion third planes 41A, 41B are positioned on the first end side which is one end side in the length direction, and the second pair of first press-fitted portion third planes 41C, 41D are positioned on the second end side which is the other end side in the length direction.

The first pair of first press-fitted portion third planes (two planes) 41A, 41B are separated from each other in the width direction. The second pair of first press-fitted portion third planes (two planes) 41C, 41D are also separated from each other in the width direction.

The first press-fitted portion third planes 41 are provided with four, and all of the four first press-fitted portion third planes 41 are orthogonal to the length direction.

Among the four planes 41A, 41B, 41C, 41D constituting the first press-fitted portion third planes, two planes 41A, 41C exist on the same plane (first plane). In addition, among the four planes 41A, 41B, 41C, 41D constituting the first press-fitted portion third planes, the remaining two planes 41B, 41D are also on the other same plane (second plane). The first plane and the second plane are separated by a predetermined distance in the width direction.

As illustrated in FIG. 4, the second press-fitted portion 13 includes a pair of second press-fitted portion first planes (two planes) 43 (43A, 43B) separated from each other in the length direction. The first press-fitted portion 11 includes a pair of second press-fitted portion second planes (two planes) 45 (45A, 45B) separated from each other in the length direction.

The second press-fitted portion first planes 43 and the second press-fitted part second planes 45 are orthogonal to the length direction. The distance between the pair of second press-fitted portion first planes 43A, 43B (distance in the length direction) is larger than the distance between the pair of second press-fitted portion second planes 45A, 45B (distance in the length direction).

The second press-fitted portion 13 includes two pairs of second press-fitted portion third planes 47 (47A, 47B, 47C, 47D).

Among the two pairs of the second press-fitted portion third planes 47, a first pair of second press-fitted portion third planes 47A, 47B and a second pair of second press-fitted portion third planes 47C, 47D are separated from each other in the length direction.

The first pair of second press-fitted portion third planes 47A, 47B are positioned on the first end side which is one end side in the length direction, and the second pair of second press-fitted portion third planes 47C, 47D are positioned on the second end side which is the other end side in the length direction.

The first pair of second press-fitted portion third planes (two planes) 47A, 47B are separated from each other in the width direction. The second pair of second press-fitted portion third planes (two planes) 47C, 47D are also separated from each other in the width direction.

The second press-fitted portion third planes 47 are provided with four, and all of the four second press-fitted portion third planes 47 are orthogonal to the length direction.

Among the four planes 47A, 47B, 47C, 47D constituting the second press-fitted portion third plane, two planes 47A, 47C exist on the same plane (first Plane). In addition, among the four planes 47A, 47B, 47C, 47D constituting the second press-fitted portion third plane, the remaining two planes 47B and 47D are also on the other same plane (second plane). However, the first plane and the second plane are separated by a predetermined distance in the width direction.

As illustrated in FIG. 2, in the installation end state, the first press-fitting portion first plane 25A and the first press-fitted portion first plane 37A are in surface contact with each other with a biasing force. In the installation end state, the first press-fitting portion first plane 25B and the first press-fitted portion first plane 37B are in surface contact with each other with a biasing force.

In the installation end state, the first press-fitting portion second plane 27A and the first press-fitted portion second plane 39A are in surface contact with each other with a biasing force. In the installation end state, the first press-fitting portion second plane 27B and the first press-fitted portion second plane 39B are in surface contact with each other with a biasing force.

With such structures, as described in the first fitting mode, the first resin bracket 3 and the second resin bracket 5 are fitted at two places in a predetermined direction (the width direction) in an interference-fitting state. A fitting of a first place of the two places is achieved by the first press-fitting portion first planes 25 and the first press-fitted portion first planes 37. A fitting of a second place of the two places is achieved by the first press-fitting portion second planes 27 and the first press-fitted portion second planes 39.

In the installation end state, the first press-fitting portion third plane 29A and the first press-fitted portion third plane 41A are in surface contact with each other with a biasing force. In the installation end state, the first press-fitting portion third plane 29B and the first press-fitted portion third plane 41B are in surface contact with each other with a biasing force. In the installation end state, the first press-fitting portion third plane 29C and the first press-fitted portion third plane 41C are in surface contact with each other with a biasing force. In the installed state, the first press-fitting portion third plane 29D and the first press-fitted portion third plane 41D are in surface contact with each other with a biasing force.

As illustrated in FIG. 4, in the installation end state, the second press-fitting portion first plane 31A and the second press-fitted portion first plane 43A are in surface contact with each other with a biasing force. In the installation end state, the second press-fitting portion first plane 31B and the second press-fitted portion first plane 43B are in surface contact with each other with a biasing force.

In the installation end state, the second press-fitting portion second plane 33A and the second press-fitted portion second plane 45A are in surface contact with each other with a biasing force. In the installation end state, the second press-fitting portion second plane 33B and the second press-fitted portion second plane 45B are in surface contact with each other with a biasing force.

With such structures, as described in the second fitting mode, the first resin bracket 3 and the second resin bracket 5 are fitted at two places in a predetermined direction (the width direction) in an interference-fitting state. A fitting of a first place of the two places is achieved by the second press-fitting portion first planes 31 and the second press-fitted portion first planes 43. A fitting of a second place of the two places is achieved by the second press-fitting portion second planes 33 and the second press-fitted portion second planes 45.

In the installation end state, the second press-fitting portion third plane 35A and the second press-fitted portion third plane 47A are in surface contact with each other with a biasing force. In the installation end state, the second press-fitting portion third plane 35B and the second press-fitted portion third plane 47B are in surface contact with each other with a biasing force. In the installation end state, the second press-fitting portion third plane 35C and the second press-fitted portion third plane 47C are in surface contact with each other with a biasing force. In the installation end state, the second press-fitting portion third plane 35D and the second press-fitted portion third plane 47D are in surface contact with each other with a biasing force.

Here, a dimension in the width direction between an end face of the first resin bracket body portion 19 and the first press-fitting portion third planes 29A, 29C in the installation preparation state is represented by reference numeral L2$a$ (see FIG. 2). A dimension in the width direction between the end face of the first resin bracket body portion 19 and the second press-fitting portion third planes 35A, 35C in the installation preparation state is represented by reference numeral L4$a$ (see FIG. 4). In the installation preparation state, the dimension L2$a$ and the dimension L4$a$ are equal to each other. In other words, in the installation preparation state, the first press-fitting portion third plane 29A, the first press-fitting portion third plane 29C, the second press-fitting portion third plane 35A, and the second press-fitting portion third plane 35C of the first member 3 exist on one plane.

In the installation preparation state, the first press-fitted portion third plane 41A, the first press-fitted portion third plane 41C, the second press-fitted portion third plane 47A, and the second press-fitted portion third plane 47C of the second member 5 exist on one plane.

Therefore, the press-fitting in the member junction structure 1 is performed by using the first press-fitting portion third plane 29A or the like as a reference plane in the width direction. As a result, a dimension indicated by reference sign L4$b$ in FIG. 4 is slightly larger than a dimension indicated by reference sign L2$b$ in FIG. 2.

Next, the installation of the second resin bracket 5 on the first resin bracket 3 will be described.

First, the position and the posture of the second resin bracket 5 with respect to the first resin bracket 3 are appropriately adjusted to the above-described installation preparation state.

In the installation preparation state, the second resin bracket 5 is moved downward by a predetermined distance with respect to the first resin bracket 3, for example, by hand, whereby the above-described installation halfway state is established (see FIG. 8B). From the state illustrated in FIG. 8B, the second resin bracket 5 is further moved downward with respect to the first resin bracket 3, for example, by hand, so that the dimension L8 becomes "0". When the dimension L8 becomes "0", the second resin bracket 5 cannot be further moved downward with respect to the first resin bracket 3 by a bare hand.

Therefore, when the second resin bracket 5 is further moved downward by a predetermined distance with respect to the first resin bracket 3 by using a dedicated press machine or a general-purpose press machine, the installation end state is completed as described above.

In the member junction structure 1 according to the embodiment, in the installation halfway state, the first press-fitting portion 7 is inserted into the second press-fitted portion 13 to provide a guide for installing the second member 5 in the first member 3. In the installation end state, the first press-fitting portion 7 is press-fitted into the first press-fitted portion 11, and the second press-fitting portion 9 is press-fitted into the second press-fitted portion 13.

With such configurations, it is possible to sufficiently secure the amount of the temporary press-fitting even when the temporary press fitting is performed in the installation halfway state by a bare hand operation. By securing a sufficient amount of the temporary press-fitting, the possibility that the second member 5 is inclined to the first member 3 can be eliminated. Further, even if a general-purpose press machine is used without using a dedicated press machine or the like, the press-fitting can be easily performed and the installation end state can be completed.

Further, since the oblique deep guide surface is not provided and the first press-fitting portion 7 is press-fitted into the first press-fitted portion 11 and the second press-fitting portion 9 is press-fitted into the second press-fitted portion 13, the joining strength of the first member 3 and the second member 5 can be secured after the press-fitting (Installation end status). The looseness between the first member 3 and the second member 5 in the installation end state can be eliminated.

On the other hand, as illustrated in FIGS. 11A to 11D, in a member junction structure 301 according to a comparative example, when a first resin bracket 303 and a second resin bracket 305 are joined to each other, a press-fitting portion 303 of the first resin bracket 307 is press-fitted into a press-fitted portion 309 of the second resin bracket 305.

However, in the member junction structure 301 according to the comparative example, since a large force is required to press-fit the press-fitting portion 303 into the press-fitted portion 309, it is difficult to press-fit by bare hands without using a dedicated press machine. Therefore, it is necessary to temporarily fit by bare hands, and then the main press-fitting is performed by using a dedicated press machine to finish the press-fitting.

However, if the press-fitting amount in the temporary press-fitting is insufficient, there is a risk that the second resin bracket 305 is inclined obliquely (see arrow A11b in FIG. 11C) when the main press-fitting is performed by using a dedicated press machine or the like (see arrow A11a in FIG. 11C).

Therefore, as illustrated in FIG. 11D, by forming oblique deep guide surfaces (long guide faces in insertion direction) 311 at the end of the press-fitted portion 309 of the second resin bracket 305, the press-fitting amount in the temporary press-fitting can be sufficiently secured.

However, if the deep guide surfaces 311 are formed, when the first resin bracket 303 and the second resin bracket 305 are press-fitted with each other, the area of the contact surface between the press-fitting portion 307 of the first resin bracket 303 and the press-fitted portion 309 of the second resin bracket 305 is reduced. As a result, the joining strength of the first resin bracket 303 and the second resin bracket 305 becomes weak, and there is a possibility that rattling occurs between the first resin bracket 303 and the second resin bracket 305.

Therefore, in the member junction structure 1 according to the embodiment, the first member 3 and the second member 5 are press-fitted in an interference-fitting state at two places in a predetermined direction after the second member 5 is completely installed in the first member 3. Thus, the joining strength between the first member 3 and the second member 5 can be further enhanced.

Further, in the member junction structure 1 according to the embodiment, since the first member 3 and the second member 5 are fitted to each other in an interference-fitting state at a plurality of places in the length direction, the joining strength of the first member 3 and the second member 5 in the length direction can be further enhanced. That is, the resistance against the rotational moment about the axis extending in the width direction becomes large.

In the member junction structure 1 according to the embodiment, the second member 5 is positioned with respect to the first member 3 in the direction orthogonal to the moving direction of the second member 5 by the guide in the installation halfway state. Thus, the posture of the second member 5 with respect to the first member 3 in the installation halfway state can be made substantially constant, and the temporary press-fitting operation can be facilitated.

Further, in the member junction structure 1 according to the embodiment, the press-fitting portion intermediate portion 15 and the press-fitted portion intermediate portion 17 are provided, and the press-fitted portion intermediate portion 17 is slightly separated from the press-fitting portion intermediate portion 15 in the installation end state. Thus, the press-fitting portions 7, 9 of the first member 3 and the press-fitted portions 11, 13 of the second member 5 are in contact with each other only at both ends in the height direction in the installation end state. In addition, it is possible to increase the resistance to the rotational moment among the joining strengths of the first member 3 and the second member 5 in the installation end state.

In the above description, the first press-fitting portion 7 and the second press-fitting portion 9 form a T-shaped guide rail, and the first press-fitted portion 11 and the second press-fitted portion 13 form a T-shaped guide groove.

Figure 9:
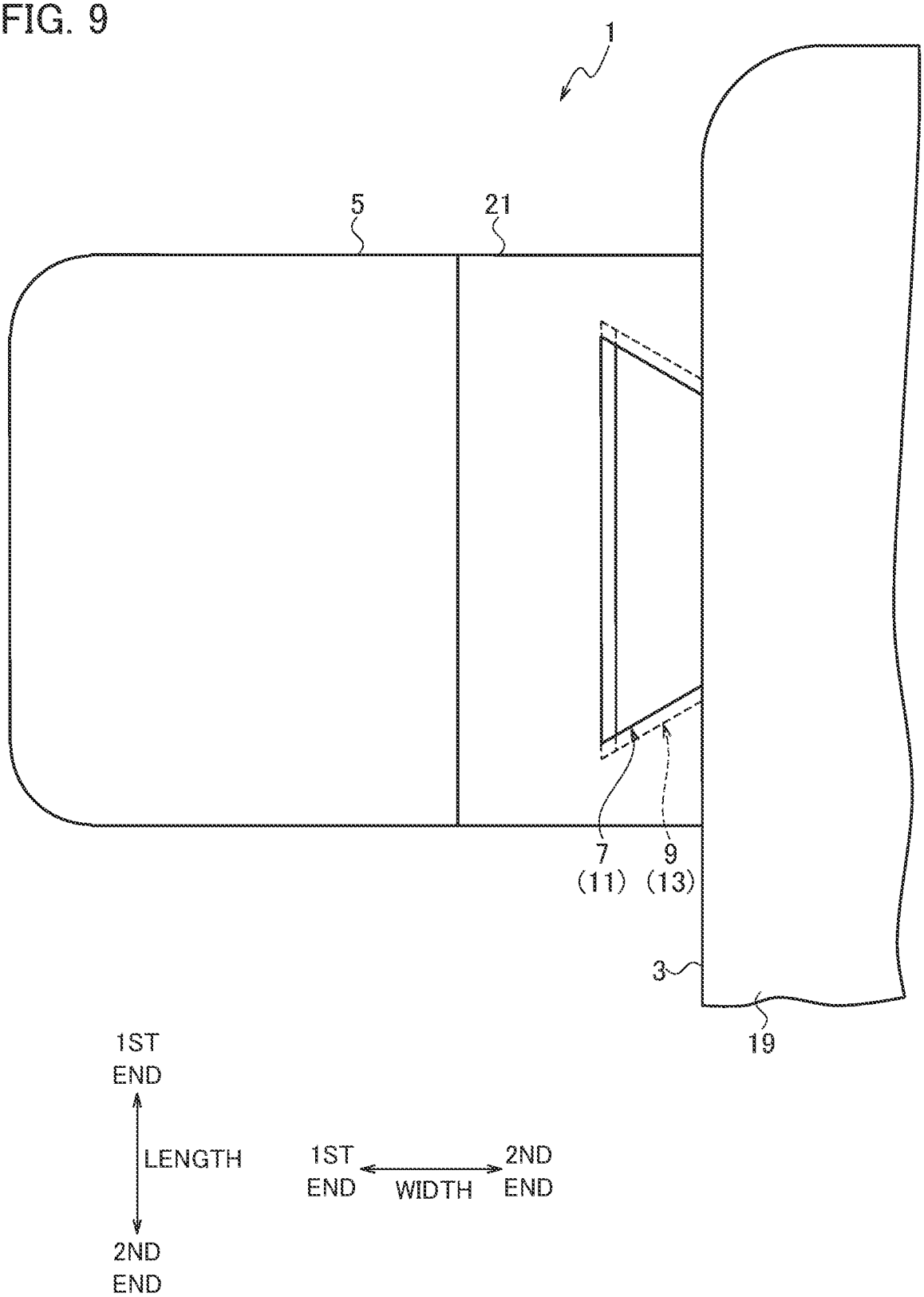
FIG. 9 is a view corresponding to FIG. 2 and illustrates a member junction structure according to a first modification.

Alternatively, as in a first modification illustrated in FIG. 9, the first press-fitting portion 7 and the second press-fitting portion 9 may form an isosceles trapezoidal guide rail, and the first press-fitted portion 11 and the second press-fitted portion 13 may form an isosceles trapezoidal guide groove (dovetail groove).

Further, as illustrated in FIGS. 10A to 10D, the press-fitting portion may be formed in a columnar shape, and the press-fitting portion may be formed in a hole. In a member junction structure 1 according to a second modification illustrated in FIGS. 10A and 10B, the first press-fitting portion 7, the second press-fitting portion 9, and the press-fitting portion intermediate portion 15 are formed in a circular columnar shape, and the first press-fitted portion 11, the second press-fitted portion 13, and the press-fitted portion intermediate portion 17 are formed in a circular columnar hole.

Figure 10A:
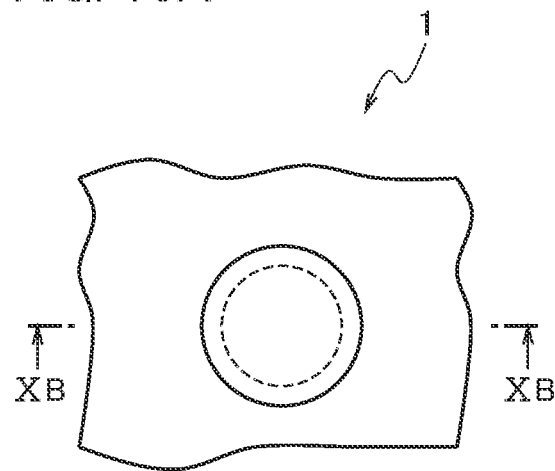
FIG. 10A is a view corresponding to FIG. 2 and illustrating a member junction structure according to a second modification.
Figure 10C:
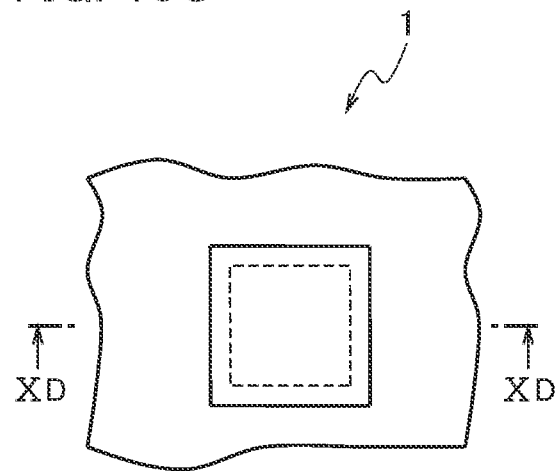
FIG. 10C is a view corresponding to FIG. 2 and illustrating a member junction structure according to a third modification.
Figure 10B:
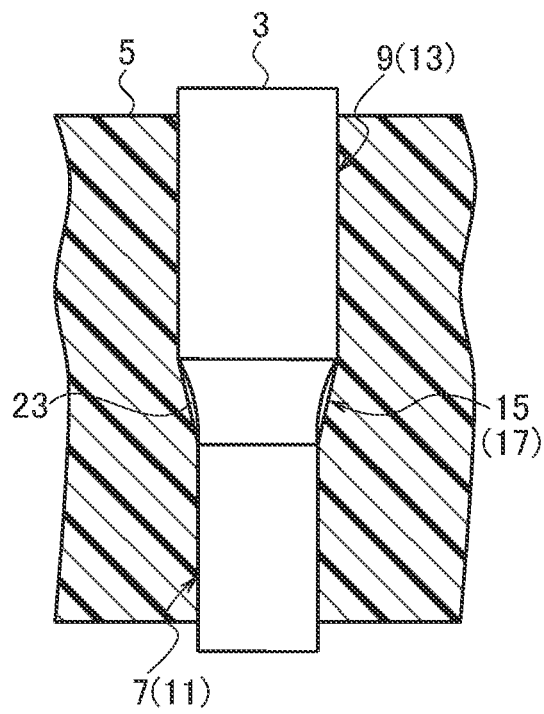
FIG. 10B illustrates a cross section taken along a line XB-XB in FIG. 10A.
Figure 10D:
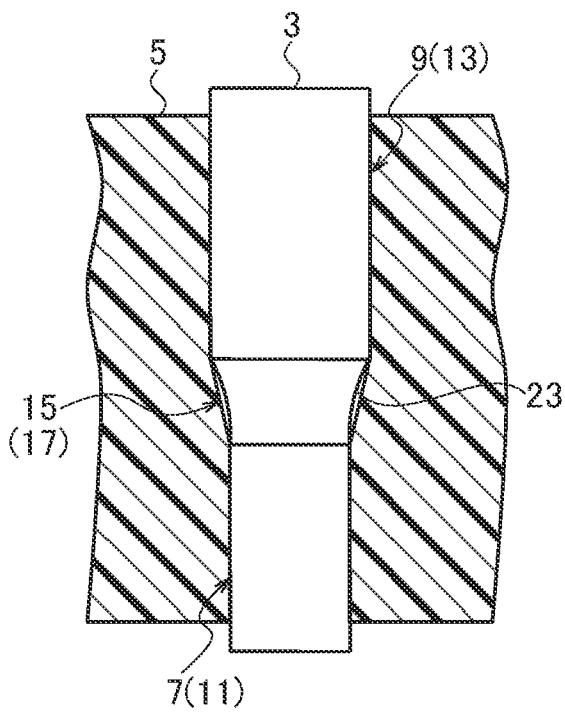
FIG. 10D is a view illustrating a cross section taken along a line XD-XD in FIG. 10C.

In a member junction structure 1 according to a third modification illustrated in FIGS. 10C and 10D, the first press-fitting portion 7, the second press-fitting portion 9, and the press-fitting portion intermediate portion 15 are formed in a square columnar shape, and the first press-fitted portion 11, the second press-fitted portion 13, and the press-fitted portion intermediate portion 17 are formed in a square columnar hole.

Incidentally, the member junction structure 1 according to the embodiment is adopted, for example, in an electric junction box such as a fuse box, a relay box, or a junction box. That is, the electric junction box is provided with the member junction structure 1 (by using the resin bracket press-fitting structure 1). When the member junction structure 1 is adopted by the fuse box, the first member 3 becomes a fuse box body portion to which the fuse is installed, and the second member 5 becomes a cover to cover the fuse or the like by being installed in the fuse box body portion.

When the member junction structure 1 is adopted by the relay box, the first member 3 becomes a relay box body portion where the relay is installed, and the second member 5 becomes a cover for covering the relay or the like by being installed in the relay box body portion. When the member junction structure 1 is adopted by the junction box, the first member 3 becomes a junction box body portion to which a terminal is connected, and the second member 5 becomes a cover for covering wiring or the like provided in the junction box body portion.

Further, the resin bracket press-fitting structure 1 according to the embodiment can be adopted in any product using a bracket such as an ECU (engine control unit), a BTU (battery unit), a voltage sensor, or a current sensor in addition to the fuse box or the like described above.

Although the embodiment has been described above, the embodiment is not limited thereto, and various modifications can be made within the scope of the gist of the present embodiment.

What is claimed is:

1. A member junction structure, comprising:
a first member provided with a first press-fitting portion and a second press-fitting portion; and
a second member provided with a first press-fitted portion and a second press-fitted portion, and configured to be installed on the first member by moving in a first direction which is a predetermined one direction with respect to the first member, wherein
in a state where the second member is halfway to be installed on the first member, the first press-fitting portion is inserted into the second press-fitted portion, thereby providing a guide for installing the second member on the first member, and
in a state where the second member is completely installed on the first member, the first press-fitting portion is press-fitted into the first press-fitted portion, the first press-fitting portion and the first press-fitted portion are in surface contact with each other with a biasing force, the second press-fitting portion is press-fitted into the second press-fitted portion, and the second press-fitting portion and the second press-fitted portion are in surface contact with each other with a biasing force.

2. The member junction structure of claim 1, wherein the first member and the second member are fitted in at least one of:
a first fitting mode where the second member is completely installed on the first member and when the first press-fitting portion is press-fitted into the first press-fitted portion, the first member and the second member are fitted in an interference-fitting state at a plurality of places in a predetermined direction different from the first direction; and
a second fitting mode where the second member is completely installed on the first member and when the second press-fitting portion is press-fitted into the second press-fitted portion, the first member and the second member are fitted in an interference-fitting state at a plurality of places in a predetermined direction different from the first direction.

3. The member junction structure of claim 2, wherein when a predetermined direction crossing the first direction is defined as a second direction,
in the first fitting mode, the first member and the second member are fitted at the plurality of places in the second direction in an interference-fitting state.

4. The member junction structure of claim 2, wherein when a predetermined direction crossing the first direction is defined as a second direction,
in the second fitting mode, the first member and the second member are fitted at the plurality of places in the second direction in an interference-fitting state.

5. The member junction structure of claim 1,
the guide in the state where the second member is halfway to be installed on the first member is a guide for positioning the second member with respect to the first member in a direction orthogonal to the moving direction of the second member.

6. The member junction structure of claim 1, wherein the first press-fitting portion and the second press-fitting portion of the first member are separated from each other in the first direction,
between the first press-fitting portion and the second press-fitting portion of the first member, a press-fitting portion intermediate portion is provided,
the first press-fitted portion and the second press-fitted portion of the second member are separated from each other in the first direction,
between the first press-fitted portion and the second press-fitted portion of the second member, a press-fitted portion intermediate portion is provided, and
in a state where the second member is completely installed on the first member, the press-fitted portion intermediate portion is slightly separated from the press-fitted portion intermediate portion.

7. The member junction structure of claim 1, wherein in the state where the second member is halfway to be installed on the first member, the first press-fitting portion is inserted into and surrounded radially by a cavity of the second press-fitted portion, and
in the state where the second member is completely installed on the first member, the first press-fitting portion is inserted into and surrounded radially by a cavity of the first press-fitted portion, and the second press-fitting portion is press-fitted into and surrounded radially by the cavity of the second press-fitted portion.

8. An electric junction box, comprising:
a resin bracket press-fitting structure comprising:
a first resin bracket comprising
a first resin bracket body portion,
a first press-fitting portion projecting from the first resin bracket body portion,
a press-fitting portion intermediate portion adjacent to the first press-fitting portion in a first direction, which is a predetermined one direction, and projecting from the first resin bracket body portion, and
a second press-fitting portion adjacent to the press-fitting portion intermediate portion in the first direction and projecting from the first resin bracket body portion; and
a second resin bracket comprising
a second resin bracket body portion,
a first press-fitted portion formed of a recess provided in the second resin bracket body portion,
a press-fitted portion intermediate portion adjacent to the first press-fitted portion in the first direction, and formed of a recess provided in the second resin bracket body portion, and a second press-fitted portion adjacent to the of the press-fitted portion intermediate portion in the first direction, and formed of a recess provided in the second resin bracket body portion, wherein by moving the second resin bracket relative to the first resin bracket in the first direction, the first press-fitting portion is press-fitted into the first press-fitted portion, and the second press-fitting portion is press-fitted into the second press-fitted portion, and in a state where the second resin bracket body portion is completely installed on the first resin bracket body portion, the first press-fitting portion is press-fitted into the first press-fitted portion, the first press-fitting portion and the first press-fitted portion are in surface contact with each other with a biasing force, the second press-fitting portion is press-fitted into the second press-fitted portion, and the second press-fitting portion and the second press-fitted portion are in surface contact with each other with a biasing force.

9. The electric junction box of claim 8, wherein in the state where the second member is halfway to be installed on the first member, the first press-fitting portion is inserted into and surrounded radially by a cavity of the second press-fitted portion, and in the state where the second member is completely installed on the first member, the first press-fitting portion is inserted into and surrounded radially by a cavity of the first press-fitted portion, and the second press-fitting portion is press-fitted into and surrounded radially by the cavity of the second press-fitted portion.

\* \* \* \* \*